US012609359B2

(12) United States Patent
Jiang et al.

(10) Patent No.: US 12,609,359 B2
(45) Date of Patent: Apr. 21, 2026

(54) CELL, METHOD FOR MANUFACTURING CELL, AND BATTERY

(71) Applicant: BATTERO TECH CORPORATION LIMITED, Shanghai (CN)

(72) Inventors: Deshun Jiang, Shanghai (CN); Wutang Zhang, Shanghai (CN)

(73) Assignee: BATTERO TECH CORPORATION LIMITED, Shanghai (CN)

( * ) Notice: Subject to any disclaimer, the term of this patent is extended or adjusted under 35 U.S.C. 154(b) by 647 days.

(21) Appl. No.: 18/087,400

(22) Filed: Dec. 22, 2022

(65) Prior Publication Data

US 2023/0361355 A1 Nov. 9, 2023

Related U.S. Application Data

(63) Continuation of application No. PCT/CN2020/139887, filed on Dec. 28, 2020.

(30) Foreign Application Priority Data

Jun. 22, 2020 (CN) .......................... 202010581209.7

(51) Int. Cl.
*H01M 10/0585* (2010.01)
*H01M 4/04* (2006.01)
(Continued)

(52) U.S. Cl.
CPC ..... *H01M 10/0585* (2013.01); *H01M 4/0404* (2013.01); *H01M 4/0435* (2013.01);
(Continued)

(58) Field of Classification Search
CPC .. H01M 4/0404; H01M 4/0435; H01M 50/54; H01M 10/0585; H01M 50/548;
(Continued)

(56) References Cited

U.S. PATENT DOCUMENTS 11,069,945 B1 * 7/2021 Hanchett ........... H01M 10/6553
2007/0166611 A1 * 7/2007 Oh ....................... H01M 10/613
429/231.95
(Continued)

FOREIGN PATENT DOCUMENTS

CN 102088105 A 6/2011
CN 102089921 A 6/2011
(Continued)

OTHER PUBLICATIONS

Machine translation of Cheng (CN107425198A) description; corresponds to Foreign Patent Doc citation No. 2 in IDS (Year: 2017).*
(Continued)

*Primary Examiner* — Jessie Walls-Murray

(57) ABSTRACT

Provided are cell, method of manufacturing cell, and battery. The cell includes separator, plural positive electrode sheets and plural negative electrode sheets, the positive and negative electrode sheets are alternately stacked, and the separator is interposed between the positive and negative electrode sheets adjacent to each other. Each positive electrode sheet includes two first long sides oppositely disposed, one of which is provided with positive electrode current collector; and two first short sides oppositely disposed, one of which is provided with first tab, the positive electrode current collector is electrically connected to the first tab; and/or each negative electrode sheet includes two second long sides oppositely disposed, one of which is provided with negative electrode current collector; and two second short sides oppositely disposed, one of which is provided with second tab, the negative electrode current collector is electrically connected to the second tab.

5 Claims, 8 Drawing Sheets

100

(51) Int. Cl.

| | |
|---|---|
| *H01M 4/139* | (2010.01) |
| *H01M 10/0583* | (2010.01) |
| *H01M 50/528* | (2021.01) |
| *H01M 50/533* | (2021.01) |
| *H01M 50/54* | (2021.01) |
| *H01M 50/466* | (2021.01) |

(52) U.S. Cl.
CPC ....... *H01M 4/139* (2013.01); *H01M 10/0583* (2013.01); *H01M 50/528* (2021.01); *H01M 50/533* (2021.01); *H01M 50/54* (2021.01); *H01M 50/466* (2021.01)

(58) Field of Classification Search
CPC ............. H01M 50/533; H01M 50/466; H01M 10/655; H01M 10/613; H01M 10/0583
See application file for complete search history.

(56) References Cited

U.S. PATENT DOCUMENTS

| | | | | |
|---|---|---|---|---|
| 2011/0129722 | A1* | 6/2011 | Yoneda | H01M 50/417 |
| | | | | 29/623.2 |
| 2014/0220435 | A1* | 8/2014 | Ogg | H01M 4/622 |
| | | | | 429/211 |
| 2014/0272537 | A1* | 9/2014 | Kretschmar | H01M 50/538 |
| | | | | 429/149 |
| 2019/0006659 | A1 | 1/2019 | Hagiwara et al. | |
| 2019/0081345 | A1* | 3/2019 | Lee | H01M 4/0404 |
| 2019/0273237 | A1* | 9/2019 | Kawai | H01M 4/13 |

FOREIGN PATENT DOCUMENTS

| | | | |
|---|---|---|---|
| CN | 107425198 | A | 12/2017 |
| CN | 109273658 | A | 1/2019 |
| CN | 110635162 | A | 12/2019 |
| CN | 111653818 | A | 9/2020 |
| CN | 212113913 | U | 12/2020 |
| EP | 1826843 | A1 | 8/2007 |
| EP | 2330665 | A1 | 6/2011 |

OTHER PUBLICATIONS

International Search Report for the International Application No. PCT/CN2020/139887 issued by the Chinese Patent Office on Mar. 30, 2021.
Written Opinion for the International Application No. PCT/CN2020/139887 issued by the Chinese Patent Office on Mar. 30, 2021.
European Search Report for European Patent Application No. 20942263.3 issued by the European Patent Office on Jul. 1, 2024.
Office Action for European Patent Application No. 20942263.3 issued by the European Patent Office on Jul. 12, 2024.
Office Action for Chinese Patent Application No. 202010581209.7 issued by the Chinese Patent Office on May 10, 2025.
Office Action for Chinese Patent Application No. 202010581209.7 issued by the Chinese Patent Office on Jun. 28, 2025.
Office Action for Chinese Patent Application No. 202010581209.7 issued by the Chinese Patent Office on Sep. 10, 2025.

* cited by examiner

300

100

10

30

20

40

50

CELL, METHOD FOR MANUFACTURING CELL, AND BATTERY

CROSS-REFERENCE TO RELATED APPLICATION

The present disclosure is a continuation of international patent application PCT/CN2020/139887, filed on Dec. 28, 2020, which claims the priority benefit of the Chinese patent application No. 202010581209.7, filed on Jun. 22, 2020, the contents of which are incorporated herein by reference in entirety.

TECHNICAL FIELD

The present disclosure relates to battery production and manufacturing, and particularly to a cell, a method for manufacturing a cell, and a battery.

BACKGROUND ART

At present, there is no uniform industry standard for the dimension of the lithium-ion secondary power battery, and the dimension and model of the power battery are largely depend on the design of battery packs. For a strip-shaped power battery with a large length-to-width ratio, the tabs of such batteries usually arranged on one or two short sides of the power battery. Apparently, such configuration leads to an overlong current transmission path, causing internal resistance increase, uneven current density and temperature distribution of the power battery.

SUMMARY

The present disclosure provides a cell, a method for manufacturing a cell, and a battery, which can increase current conduction paths and reduce an electron conduction distance of each layer of electrode sheet, thereby achieving the effects of reducing the internal resistance of the battery and equalizing the current density, and improving the heat dissipation effect in the battery operation process.

Embodiments of the present disclosure may be realized as follows.

In a first aspect, an embodiment of the present disclosure provides a cell, including a separator; a plurality of positive electrode sheets; and a plurality of negative electrode sheets; wherein the plurality of positive electrode sheets and the plurality of negative electrode sheets are alternately stacked; and the separator is interposed between the plurality of positive electrode sheets and the plurality of negative electrode sheets that are adjacent to each other;

each of the plurality of positive electrode sheets includes two first long sides provided opposite to each other and two first short sides provided opposite to each other; one first long side of the two first long sides is provided with a positive electrode current collector; one first short side of the two first short sides is provided with a first tab; and the positive electrode current collector is electrically connected to the first tab; and/or each of the plurality of negative electrode sheets includes two second long sides provided opposite to each other and two second short sides provided opposite to each other; one second long side of the two second long sides is provided with a negative electrode current collector; one second short side of the two second short sides is provided with a second tab; and the negative electrode current collector is electrically connected to the second tab.

In an optional embodiment, after the plurality of positive electrode sheets and the plurality of negative electrode sheets are alternately stacked; the positive electrode current collector of each of the plurality of the positive electrode sheets is located at the same side; and the negative electrode current collector of each of the plurality of negative electrode sheets is located at a side opposite to the side where the positive electrode current collector of each of the plurality of positive electrode sheets is located; and the first tab of each of the plurality of positive electrode sheets is located at the same side; and the second tab of each of the plurality of negative electrode sheets is located at a side same as or opposite to the side where the first tab of each of the plurality of positive electrode sheets is located.

In an optional embodiment, each of the plurality of positive electrode sheets is provided with one positive electrode current collector, and the positive electrode current collector of each of the plurality of positive electrode sheets is electrically connected to each other.

In an optional embodiment, the cell further includes a first connecting substrate; the first connecting substrate is welded or punched to the positive electrode current collector of each of the plurality of positive electrode sheets, respectively, so as to allow the positive electrode current collector of each of the plurality of positive electrode sheets to be electrically connected to each other; or a metal layer is sprayed between the positive electrode current collector of each of the plurality of positive electrode sheets, so as to allow the positive electrode current collector of each of the plurality of positive electrode sheets to be electrically connected to each other.

In an optional embodiment, each of the plurality of negative electrode sheets is provided with one negative electrode current collector; and the negative electrode current collector of each of the plurality of negative electrode sheets is electrically connected to each other.

In an optional embodiment, the cell further includes a second connecting substrate; the second connecting substrate is welded or punched to each of the plurality of negative electrode current collectors, respectively, so as to allow the negative electrode current collector of each of the plurality of the negative electrode sheets to be electrically connected to each other; or a metal layer is sprayed between the negative electrode current collector of each of the plurality of negative electrode sheets, so as to allow the negative electrode current collector of each of the plurality of the negative electrode sheets to be electrically connected to each other.

In an optional embodiment, the first short side provided with the first tab is provided with a first margin base material; and the first tab and the positive electrode current collector are electrically connected to each other through the first margin base material.

In an optional embodiment, the first tab is provided in the middle of the first short side; and a part of the first short side located between the first tab and the positive electrode current collector is provided with the first margin base material.

In an optional embodiment, the first margin base material is provided thereon with a conductive coating, so as to electrically connect the first tab and the positive electrode current collector.

In an optional embodiment, the second short side provided with the second tab is provided with a second margin base material; and the second tab and the negative electrode current collector are electrically connected to each other through the second margin base material.

In an optional embodiment, the second margin base material is provided thereon with a conductive coating, so as to electrically connect the second tab and the negative electrode current collector.

In an optional embodiment, the second tab is provided in the middle of the second short side; and a part of the second short side located between the second tab and the negative electrode current collector is provided with a second margin base material.

In a second aspect, an embodiment of the present disclosure provides a method for manufacturing a cell, including:

preparing positive electrode sheets, wherein each positive electrode sheet of the positive electrode sheets includes two first long sides provided opposite to each other and two first short sides provided opposite to each other; one first long side of the two first long sides is provided with a positive electrode current collector; one first short side of the two first short sides is provided with a first tab; and the positive electrode current collector is electrically connected to the first tab; and/or preparing negative electrode sheets, wherein each negative electrode sheet of the negative electrode sheets includes two second long sides provided opposite to each other and two second short sides provided opposite to each other; one second long side of the two second long sides is provided with a negative electrode current collector; one second short side of the two second short sides is provided with a second tab; and the negative electrode current collector is electrically connected to the second tab;

preparing a separator; and alternately stacking the positive electrode sheets and the negative electrode sheets; and interposing the separator between the positive electrode sheets and the negative electrode sheets that are adjacent to each other.

In an optional embodiment, the step of preparing a positive electrode sheet includes:

coating a positive electrode slurry on the first base material in accordance with grid-shaped coating; leaving a margin around four edges of a coating formed with the positive electrode slurry on the first base material;

drying the positive electrode slurry on first base material; and rolling and cutting the first base material to obtain the positive electrode sheets, so that the margin at the first long side of each positive electrode sheet of the positive electrode sheets forms the positive electrode current collector; the margin at the first short side of each positive electrode sheet of the positive electrode sheets forms the first tab and a first margin base material; and the positive electrode current collector and the first tab are electrically connected to each other through the first margin base material.

In an optional embodiment, the step of preparing a negative electrode sheet includes:

coating a negative electrode slurry on the second base material in accordance with grid-shaped coating; leaving a margin around four edges of a coating formed with the negative electrode slurry on the second base material;

drying the negative electrode slurry on the second base material; and rolling and cutting the second base material to obtain a negative electrode sheet, so that the margin at the second long side of each negative electrode sheet of the negative electrode sheets forms the negative electrode current collector; the margin at the second short side of each negative electrode sheet of the negative electrode sheets forms the second tab and a second margin base material; and the negative electrode current collector and the second tab are electrically connected to each other through the second margin base material.

In an optional embodiment, the step of alternately stacking the positive electrode sheets and the negative electrode sheets further includes:

stacking the positive electrode current collector of each positive electrode sheet of the positive electrode sheets at the same side, and stacking the negative electrode current collector of each negative electrode sheet of the negative electrode sheets at a side opposite to the side where the positive electrode current collector of each of the positive electrode sheets is stacked; and stacking the first tab of each positive electrode sheet of the positive electrode sheets at the same side; and stacking the second tab of each of the negative electrode sheets at a side opposite to the side where the positive electrode current collector of each of the positive electrode sheets is stacked.

In an optional embodiment, after the step of alternately stacking the positive electrode sheets and the negative electrode sheets, further including:

electrically connecting the positive electrode current collector of each positive electrode sheet of the positive electrode sheets to each other; and electrically connecting the negative electrode current collector of each negative electrode sheet of the negative electrode sheets to each other.

In an optional embodiment, the step of electrically connecting the positive electrode current collector of each positive electrode sheet of the positive electrode sheets to each other includes: providing a first connecting substrate; and electrically connecting the positive electrode current collector of each positive electrode sheet of the positive electrode sheets to the first connecting substrate; and the step of electrically connecting the negative electrode current collector of each negative electrode sheet of the negative electrode sheets to each other includes: providing a second connecting substrate; and electrically connecting each negative electrode current collector to the second connecting substrate.

In an optional embodiment, the step of alternately stacking the positive electrode sheets and the negative electrode sheets includes:

laminating the positive electrode sheet, the separator, and the negative electrode sheet in a single-sheet laminating mode to obtain a semi-finished bare cell;

alternatively, hot-pressing the positive electrode sheets and the separator to obtain a first compound unit, and laminating the first compound unit with the negative electrode sheets to obtain a semi-finished bare cell;

alternatively, hot-pressing the negative electrode sheet and the separator to obtain a second compound unit, and laminating the second compound unit with the positive electrode sheets to obtain a semi-finished bare cell.

In a third aspect, an embodiment of the present disclosure provides a battery, including a shell and the cell according to any one of the preceding embodiments, wherein the cell is provided in the shell.

The beneficial effects of the embodiments of the present disclosure include, for example:

for the cell, the positive electrode current collector is provided on one of the first long sides and the first tab is provided on one of the first short sides of each positive electrode sheet, the negative electrode current collector is provided on one of the second long sides and the second tab is provided on one of the second short sides of each negative electrode sheet. By providing the positive electrode current collector and the negative electrode current collector on the long sides, the current conduction channels can be increased, so that the current distribution is more uniform, the resistance is reduced, which is beneficial to improving the heat dissipation effect.

In the method for manufacturing the cell, by providing the positive electrode current collector on the long side of each positive electrode sheet, providing the negative electrode current collector on the long side of each negative electrode sheet, connecting the positive electrode current collector and the first tab, and connecting the negative electrode current collector and the second tab, the manufacturing process is simple, the current conduction paths can be increased, and the electron conduction distance of each layer of electrode sheet can be reduced, thus achieving the purposes of reducing the internal resistance of the cell, equalizing the current density, and improving the heat dissipation effect in the battery operation process.

The battery, including the above cell, is easy to assemble, and facilitates reducing the internal resistance of the battery, equalizing the current density, and improving the heat dissipation effect in the battery operation process.

BRIEF DESCRIPTION OF DRAWINGS

In order to more clearly illustrate the technical solutions of embodiments of the present disclosure, accompanying drawings which need to be used in the embodiments will be introduced below briefly. It should be understood that the accompanying drawings below merely show some embodiments of the present disclosure, and therefore should not be considered as limitation to the scope. Those ordinarily skilled in the art still could obtain other relevant accompanying drawings according to these accompanying drawings, without using creative effort.

Figure 1:
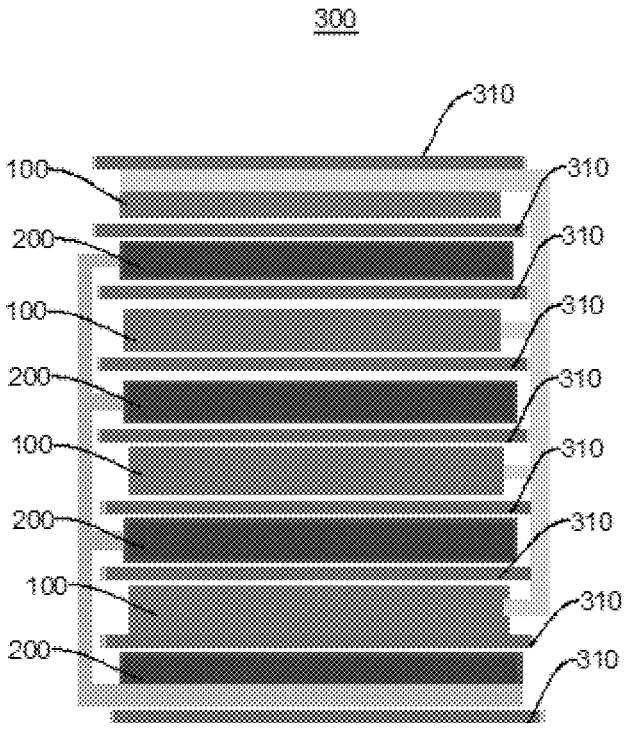
FIG. 1 is a structural schematic view of a cell provided in an embodiment of the present disclosure.

Reference signs: 100-positive electrode sheet; 101-first long side; 103-first short side; 105-first coating; 107-first base material; 110-positive electrode current collector; 130-first tab; 140-first connecting substrate; 150-first margin base material; 200-negative electrode sheet; 201-second long side; 203-second short side; 205-second coating; 207-second base material; 210-negative electrode current collector; 230-second tab; 240-second connecting substrate; 250-second margin base material; 300-cell; 310-separator; 10-double-sided positive electrode sheet; 20-double-sided negative electrode sheet; 30-single-sided positive electrode sheet; 40-single-sided negative electrode sheet; 50-first thermal compound unit; 60-second thermal compound unit; 70-third thermal compound unit.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in different configurations.

Therefore, the detailed description below of the embodiments of the present disclosure provided in the accompanying drawings is not intended to limit the scope of protection of the present disclosure, but merely represents chosen embodiments of the present disclosure. Based on the embodiments of the present disclosure, all of other embodiments, obtained by a person ordinarily skilled in the art without using creative effort, shall fall within the scope of protection of the present disclosure.

It should be noted that similar reference signs and letters represent similar items in the following accompanying drawings, therefore, once a certain item is defined in one accompanying drawing, it is not needed to be defined or explained in subsequent accompanying drawings.

In the description of the present disclosure, it should be noted that the orientation or positional relationship indicated by the terms "upper", "lower", "inner", "outer", etc., if appear, are based on the orientation or positional relationship shown in the accompanying drawings, or the orientation or positional relationship in which the inventive product is usually placed in use, and it is only for facilitating describing the present disclosure and simplifying the description, rather than indicating or implying that the related device or element must be in a specific orientation, or constructed or operated in a specific orientation, and therefore it cannot be understood as a limitation to the present disclosure.

Besides, terms such as "first" and "second" are merely for distinguishing the description, but should not be construed as indicating or implying importance in the relativity.

It should be indicated that the features in the embodiments of the present disclosure may be combined with each other without conflict.

The electrification of travel and clean energy in the future are the development trends of the automobile industry in the future. China has encouraged the development of the electric vehicle industry through subsidies, dual-credit policy and so on, and Norway, the United Kingdom, Japan, the United States, etc. have shown electrification schedules one after another. In recent years, the sales volume of electric vehicles has shown non-linear growth. In 2017, the global sales of electric vehicles exceeded one million. At present, the electric vehicle market has begun to erupt in full, and the market prospect is promising. As the core power component of the power battery, the lithium-ion battery has become a key factor in the marketization of electric vehicles.

For the current lithium ion secondary power batteries, especially the strip-shaped power batteries with a relatively large length-to-width ratio, the conventional processes mostly adopt the mode of providing a tab on one or two short sides of the power battery. Due to the overlong current transmission path, this configuration easily causes the problems of internal resistance increase, uneven current density and temperature distribution of the power battery. Therefore, how to reduce the internal resistance of the power battery with a large length-to-width ratio, equalize the current density and temperature distribution of the power battery, and improve the power performance of the power battery as much as possible, while ensuring other battery performances such as energy density, is a difficult problem.

In order to overcome the defects in the prior art, the present disclosure provides the cell 300, a method for manufacturing the cell 300, and a battery including the cell 300, which are especially suitable for configuring a strip-shaped power battery with a relatively large length-to-width ratio, and can reduce the internal resistance of the power battery with a large length-to-width ratio, equalize the current density and temperature distribution of the power battery, and improve the heat dissipation effect as much as possible, while ensuring other battery performances such as energy density as much as possible.

Referring to FIG. 1, the present embodiment provides a cell 300 suitable for configuring a strip-shaped power battery with a large length-to-width ratio. The cell 300 includes positive electrode sheets 100, negative electrode sheets 200, and separators 310. A plurality of positive electrode sheets 100 and a plurality of negative electrode sheets 200 are alternately stacked, the separators 310 are interposed between the plurality of positive electrode sheets 100 and the plurality of negative electrode sheets 200 that are adjacent to each other, and the separator 310 plays an insulating and isolating role, that is, in the cell 300, a stacking order from bottom to top is the positive electrode sheet 100, the separator 310, the negative electrode sheet 200, the separator 310, the positive electrode sheet 100, and the separator 310, and so on in sequence. It should be noted that, according to an actual situation, a bottommost layer of the cell 300 may be the separator 310 and also may be the positive electrode sheet 100 or the negative electrode sheet 200, and a topmost layer may be the separator 310 and also may be the positive electrode sheet 100 or the negative electrode sheet 200, which is not specifically limited herein.

Figure 2:
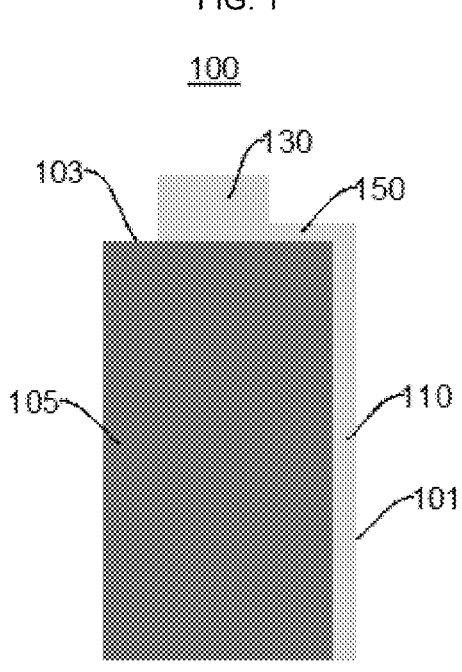
FIG. 2 is a structural schematic view of a positive electrode sheet of the cell provided in an embodiment of the present disclosure from a first angle of view.
Figure 3:
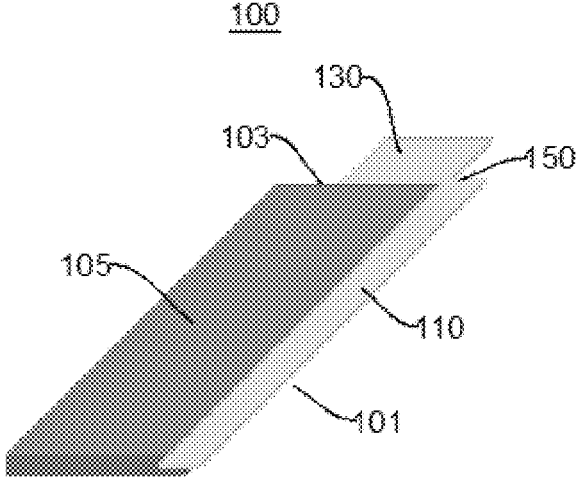
FIG. 3 is a structural schematic view of the positive electrode sheet of the cell provided in an embodiment of the present disclosure from a second angle of view.

Referring to FIG. 2 and FIG. 3, each positive electrode sheet 100 is shaped as a rectangular sheet, and includes two first long sides 101 provided opposite to each other and two first short sides 103 provided opposite to each other, wherein one of the first long sides 101 is provided with a positive electrode current collector 110, one of the first short sides 103 is provided with a first tab 130, and the positive electrode current collector 110 is electrically connected to the first tab 130; that is, one long side of the positive electrode sheet 100 is provided with the positive electrode current collector 110, and one short side is provided with the first tab 130. Optionally, the positive electrode sheet 100 uses an aluminum foil as a first base material 107 (see FIG. 10). The positive electrode sheet 100 includes two surfaces, i.e., a front surface and a back surface, formed by the two first long sides 101 and the two first short sides 103. At least one surface of the positive electrode sheet 100 is provided with a first coating 105 and a margin that is not covered by the first coating 105. The margin is arranged at one of the two first long sides 101, and the margin serves as the positive electrode current collector 110 of the positive electrode sheet 100. One of the first short sides 103 of the positive electrode sheet 100 is provided with the first tab 130, and the first tab 130 is electrically connected to the positive electrode current collector 110. In the present embodiment, the first tab 130 is provided in the middle of one of the first short sides 103, the first tab 130 has a width smaller than that of the first short side 103, the first short side 103 is provided with a section of first margin base material 150, and the first margin base material 150 is located between the first tab 130 on the first short side 103 and the positive electrode current collector 110 and is configured to implement electrical connection between the first tab 130 and the positive electrode current collector 110. In the present embodiment, one first long side 101 and one first short side 103 of the positive electrode sheet 100 are respectively provided with a margin; specifically, the margin on the first long side 101 serves as the positive electrode current collector 110; and the margin (that is, the first margin base material 150) on the first short side 103 serves as an electrical conduction body for the first tab 130 and the positive electrode current collector 110. The first margin base material 150 may be a metal sheet. Optionally, the first margin base material 150 is provided thereon with a conductive coating, so as to enhance the electrical connection performance of the first tab 130 and the positive electrode current collector 110. The two margins (namely, the margin on one first long side 101 and the first margin base material 150 on one first short side 103) on the same positive electrode sheet 100 may be formed at one time, which simplifies the production process. In addition, the margins are beneficial to increasing current conduction channels and reducing an electrical conduction distance of each layer of electrode sheet, so as to achieve the purposes of reducing the internal resistance and equalizing the current density, and also facilitate equalizing the temperature and improving the heat dissipation effect. Of course, in other optional embodiments, the first tab 130 and the positive electrode current collector 110 also may realize the electrical connection in other manners, such as metal wire connection, which are not specifically limited herein.

Figure 4:
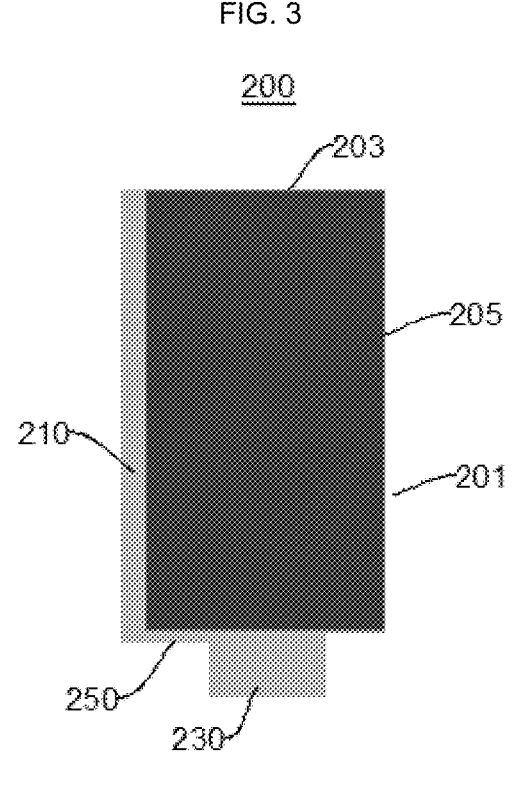
FIG. 4 is a structural schematic view of a negative electrode sheet of the cell provided in an embodiment of the present disclosure from a first angle of view.
Figure 5:
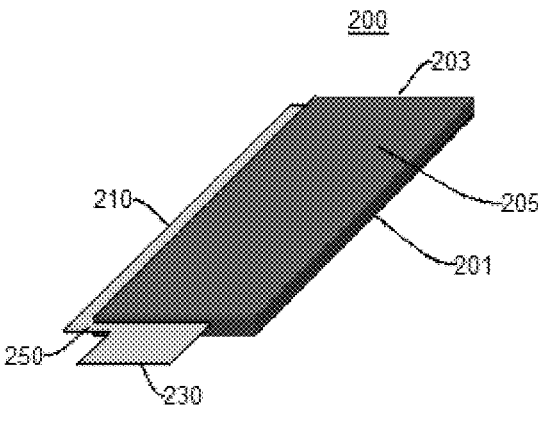
FIG. 5 is a structural schematic view of the negative electrode sheet of the cell provided in an embodiment of the present disclosure from a second angle of view.

Similarly, referring to FIG. 4 and FIG. 5, each negative electrode sheet 200 is shaped as a rectangular sheet, and includes two second long sides 201 provided opposite to each other and two second short sides 203 provided opposite to each other, wherein one of the second long sides 201 is provided with a negative electrode current collector 210, one of the second short sides 203 is provided with a second tab 230; and the negative electrode current collector 210 is electrically connected to the second tab 230. Optionally, each negative electrode sheet 200 uses a copper foil as a second base material 207 (see FIG. 11). At least one surface of the negative electrode sheet 200 is provided with a second coating 205 and a margin that is not covered by the second coating 105. The margin is arranged at one of the two second long sides 201, and the margin serves as the negative electrode current collector 210 of the negative electrode sheet 200. One of the second short sides 203 of the negative electrode sheet 200 is provided with the second tab 230, and the second tab 230 is electrically connected to the negative electrode current collector 210. In the present embodiment, the second tab 230 is provided in the middle of one of the second short sides 203, the second tab 230 has a width smaller than that of the second short side 203. The second short side 203 is provided with a section of second margin base material 250, and the second margin base material 250 is located between the second tab 230 on the second short side 203 and the negative electrode current collector 210 and is configured to implement electrical connection between the second tab 230 and the negative electrode current collector 210, and the second margin base material 250 may be a metal sheet. Optionally, the second margin base material 250 is provided thereon with a conductive coating, so as to enhance the electrical connection performance of the second tab 230 and the negative electrode current collector 210, then the electrical connection is more stable and reliable. In the present embodiment, one second long side 201 and one second short side 203 of the negative electrode sheet 200 are respectively provided with a margin; specifically, the margin on the second long side 201 serves as the negative electrode current collector 210; and the margin (that is, the second margin base material 250) on the second short side 203 serves as an electrical conduction body for the second tab 230 and the negative electrode current collector 210. The two margins on the same negative electrode sheet 200 may be formed at one time, which simplifies the production process. In addition, the margins are beneficial to increasing current conduction channels and reducing an electrical conduction distance of each layer of electrode sheet, so as to achieve the purposes of reducing the internal resistance of the battery and equalizing the current density, and also facilitate improving the heat dissipation effect. Of course, in other optional embodiments, the second tab 230 and the negative electrode current collector 210 also may realize the electrical connection in other manners, such as metal wire connection, which are not specifically limited herein.

After the plurality of positive electrode sheets 100 and the plurality of negative electrode sheets 200 are alternately stacked. The plurality of positive electrode current collectors 110 are connected to each other, to realize the electrical conduction. The plurality of negative electrode current collectors 210 are connected to each other, to realize the electrical conduction. With such configuration, the current conduction channels of the positive electrode sheets 100 and the negative electrode sheets 200 are increased, which facilitates uniform current distribution, reduces the internal resistance of the cell 300, and solves the problem of uneven heating of the cell 300.

It should be noted that, for each positive electrode sheet 100, only one first long side 101 of the two first long sides 101 and one first short side of the two first short sides 103 are provided with the margin; and the other first long side 101 of the two first long sides 101 and the other first short side 103 of the two short sides 103 are not provided with the margin. For each negative electrode sheet 200, only one second long side 201 of the two second long sides 201 and one second short side 203 of the two second short sides 203 are provided with the margin; and the other second long side 201 of the two second long sides 201 and the other second short side 203 of the two second short sides 203 are not provided with the margin. It can be easily understood that, the first long side 101 has a length greater than that of the first short side 103, and the second long side 201 has a length greater than that of the second short side 203. In the present embodiment, the length of the first long side 101 is substantially equal to that of the second long side 201, and the length of the first short side 103 is substantially equal to that of the second short side 203. In addition, it should be noted that, in order to reduce the internal resistance of the cell 300 and allow the current density to be distributed more uniform, it is also possible to modify only the positive electrode sheet 100, that is, the margin is reserved on one long side of the positive electrode sheet 100 to form the positive electrode current collector 110, the first tab 130 is provided on one short side, and the first tab 130 is electrically connected to the positive electrode current collector 110. Alternatively, only the negative electrode sheet 200 is modified, that is, the margin is reserved on one long side of the negative electrode sheet 200 to form the negative electrode current collector 210, the second tab 230 is provided on one short side, and the second tab 230 is electrically connected to the negative electrode current collector 210, then the purposes of reducing the internal resistance of the cell 300, making the current density to be distributed more uniform, and having good heat dissipation performance can also be achieved. In the present embodiment, in order to realize structural symmetry, and further reduce the internal resistance, improve the current density equalizing performance and the heat dissipation effect, the positive electrode sheet 100 and the negative electrode sheet 200 of the structure of the cell 300 are simultaneously modified.

Figure 6:
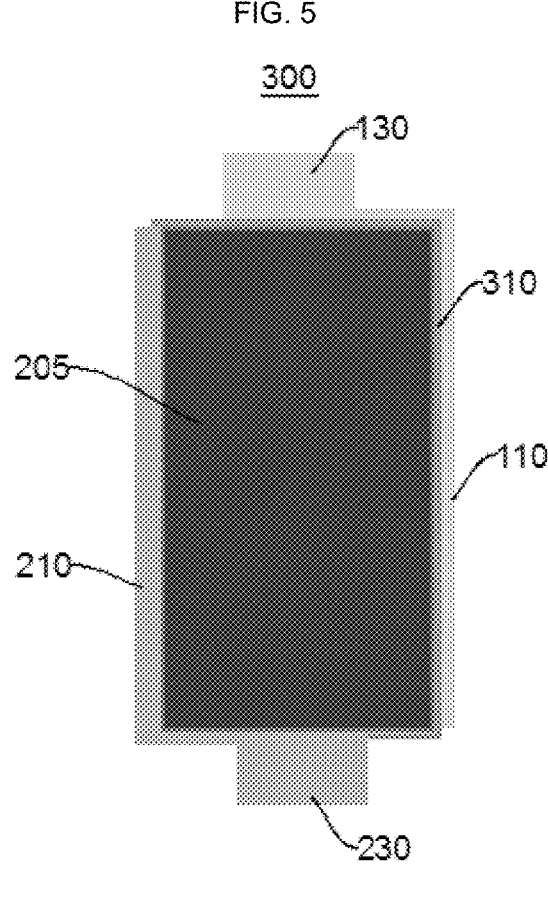
FIG. 6 is a structural top view obtained from a first laminating (stacking) mode of the cell provided in an embodiment of the present disclosure.
Figure 7:
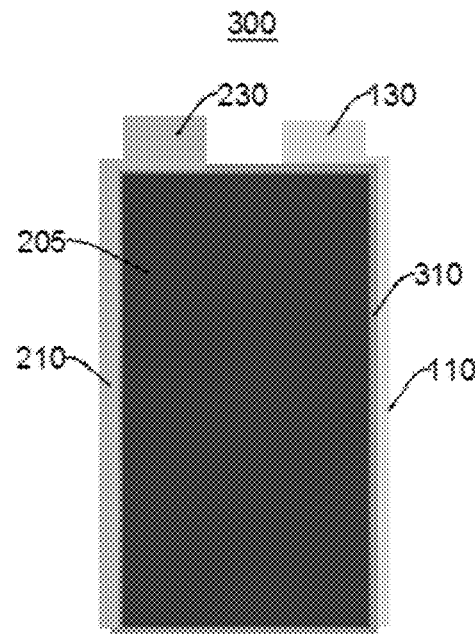
FIG. 7 is a structural top view obtained from a second laminating mode of the cell provided in an embodiment of the present disclosure.

Optionally, after the plurality of positive electrode sheets 100 and the plurality of negative electrode sheets 200 are alternately stacked, the plurality of positive electrode current collectors 110 are located at the same side; and the plurality of negative electrode current collectors 210 are located at a side opposite to the side where the positive electrode current collector 110 is located. The plurality of first tabs 130 are located at the same side; and the plurality of second tabs 230 are located at a side same as or opposite to the side where the first tab 130 is located. That is, the plurality of negative electrode current collectors 210 and the plurality of positive electrode current collectors 110 are respectively located on opposite sides of two long sides, the first tabs 130 and the second tabs 230 may be respectively located on opposite sides of two short sides, as shown in FIG. 6, and also may be located on the short sides of the same side, as shown in FIG. 7, and when the first tabs 130 and the second tabs 230 are located on the short sides of the same side, the first tabs 130 and the second tabs 230 are staggered.

Figure 8:
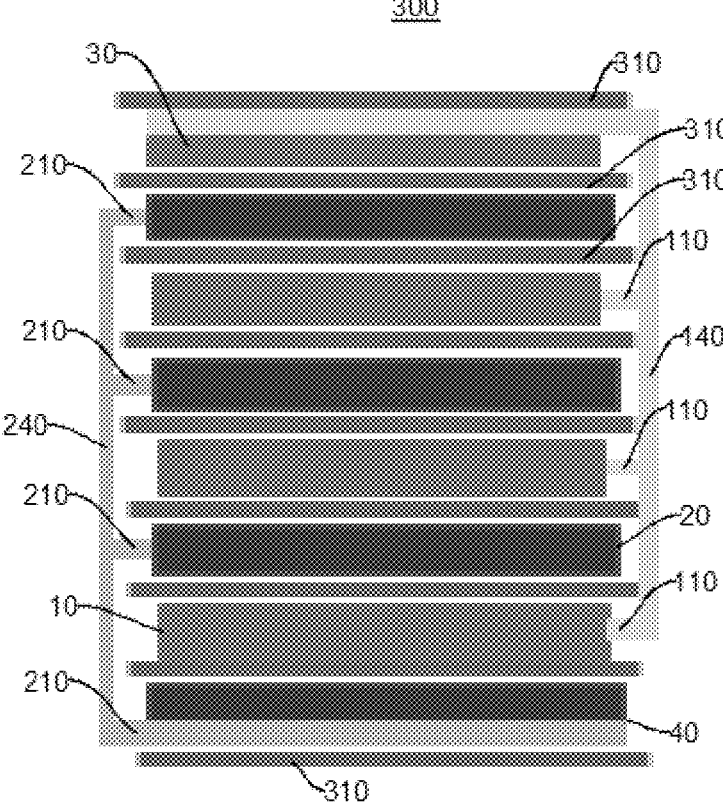
FIG. 8 is a sectional schematic view of a single-sheet lamination structure of the cell provided in an embodiment of the present disclosure.

Referring to FIG. 8, the plurality of positive electrode current collectors 110 are connected to each other to realize the electrical conduction. Optionally, a first connecting substrate 140 is provided at one side of the plurality of positive electrode current collectors 110, where the first connecting substrate 140 is made of a conductive material, including but not limited to metal, graphite, or the like. The first connecting substrate 140 is welded or punched to each positive electrode current collector 110, respectively, so as to allow the plurality of positive electrode current collectors 110 to be electrically connected to each other. Alternatively, metal layers are sprayed or coated between the plurality of positive electrode current collectors 110, so as to allow the plurality of positive electrode current collectors 110 to be electrically connected to each other, which is not specifically limited herein. Optionally, the first connecting substrate 140 is provided substantially perpendicular to a section of the cell 300, that is, provided perpendicular to a direction of the first coating 105, so as to facilitate electrical connection between the first connecting substrate 140 and an end surface of each positive electrode current collector 110 away from the first coating 105. In the case of ensuring that all positive electrode current collectors 110 are in electrical connection, excess parts of the positive electrode current collectors 110 can be removed, so that the end surfaces of the plurality of positive electrode current collectors 110 away from the first coatings 105 are located on the same plane, in this way, the electrical connection between each positive electrode current collector 110 and the first connecting substrate 140 is facilitated, the contact areas are larger, the electrical connection performance is more stable, and at the same time, it is also beneficial to reducing the spaces occupied by the positive electrode current collectors 110, so that the structure of the cell 300 is more compact, and has a smaller volume and a lighter weight.

Similarly, the plurality of negative electrode current collectors 210 are connected to each other to realize the electrical conduction. Optionally, a second connecting substrate 240 is provided at one side of the plurality of negative electrode current collectors 210, where the second connecting substrate 240 is made of a conductive material, including but not limited to metal, graphite, or the like. The second connecting substrate 240 is welded or punched to each negative electrode current collector 210, so that the plurality of negative electrode current collectors 210 realize the electrical connection. Alternatively, metal layers are sprayed or coated between the plurality of negative electrode current collectors 210, so that the plurality of negative electrode current collectors 210 are electrically connected to each other, which is not specifically limited herein. Optionally, the second connecting substrate 240 is provided substantially perpendicular to the section of the cell 300, that is, provided perpendicular to a direction of the second coating 205, so as to facilitate electrical connection between the second connecting substrate 240 and an end surface of each negative electrode current collector 210 away from the second coating 205. In the case of ensuring that all negative electrode current collectors 210 are in electrical connection, excess parts of the negative electrode current collectors 210 can be removed, so that the end surfaces of the plurality of negative electrode current collectors 210 away from the second coatings 205 are located on the same plane, in this way, the electrical connection between each negative electrode current collector 210 and the second connecting substrate 240 is facilitated, the contact areas are larger, the electrical connection performance is more stable, and at the same time, it is also beneficial to reducing the spaces occupied by the negative electrode current collectors 210, so that the structure of the cell 300 is more compact, and has a smaller volume and a lighter weight.

In the present embodiment, all of the positive electrode current collectors 110 and the negative electrode current collectors 210 are not in contact at any part and are completely insulated and disconnected. They may be insulated and isolated through the separators 310, and also may be insulated and separated in other manners, which is not specifically limited herein. Optionally, the plurality of first tabs 130 may be connected in a welding manner, and are welded to external leads for positive tabs; and the plurality of second tabs 230 may be connected in a welding manner, and are welded to external leads for negative tabs. Certainly, it is not limited to the welding manner, and also may be punched, connecting by metal component, connecting by metal wire, or the like, so as to realize stable electrical connection.

A main assembling process of the cell 300 provided in the embodiments of the present disclosure is as follows.

The margin is reserved at any one of the first long sides 101 of the positive electrode sheet 100 to serve as the positive electrode current collector 110, the first tab 130 is provided on any one of the first short sides 103, and a section of margin (the first margin base material 150) is on the first short side 103 to serve as the electrical conduction body for the first tab 130 and the positive electrode current collector 110; and optionally, the first tab 130 also may be formed by reserving a margin. The margin is at any one of the second long sides 201 of the negative electrode sheet 200 to serve as the negative electrode current collector 210, the second tab 230 is provided on any one of the second short sides 203, and a section of margin (the second margin base material 250) is reserved on the second short side 203 to serve as the electrical conduction body for the second tab 230 and the negative electrode current collector 210. Optionally, the second tab 230 also may be formed by reserving the margin.

The plurality of positive electrode sheets 100 and the plurality of negative electrode sheets 200 are alternately stacked, and a positive electrode sheet 100 and a negative electrode sheet 200 that are adjacent are provided with the separator 310 therebetween, so that the positive electrode sheet 100 and the negative electrode sheet 200 are insulated and disconnected. After the stacking, the plurality of positive electrode current collectors 110 are located on the same side, the plurality of negative electrode current collectors 210 are located on the same side, and the plurality of positive electrode current collectors 110 and the plurality of negative electrode current collectors 210 are located on two opposite long sides respectively. After the stacking, the plurality of first tabs 130 are located on the same side, the plurality of second tabs 230 are located on the same side, and the first tabs 130 and the second tabs 230 may be located on the short sides of two opposite sides respectively, and also may be located on the short sides of the same side simultaneously.

The plurality of positive electrode current collectors 110 are electrically connected to each other by means of welding, metal spraying, and so on, the plurality of negative electrode current collectors 210 are electrically connected to each other by means of welding, metal spraying, and so on, and all the positive electrode current collectors 110 and all the negative electrode current collectors 210 are completely insulated and disconnected without any part in contact. All of the first tabs 130 are pre-welded together, and all of the second tabs 230 are pre-welded together; the cell 300 is installed into a shell, an insulating member is provided between the shell and the positive electrode current collectors 110, and an insulating member is provided between the shell and the negative electrode current collectors 210, so as to prevent the positive electrode sheets 100 or the negative electrode sheets 200 from being in contact with the shell to be short-circuited.

According to the cell 300 provided in the present embodiment, by providing the positive electrode current collector 110 on one long side of positive electrode sheet 100, providing the first tab 130 on one short side, and electrically connecting the first tab 130 to the positive electrode current collector 110; providing the negative electrode current collector 210 on one long side of negative electrode sheet 200, providing the second tab 230 on one short side, and electrically connecting the second tab 230 to the negative electrode current collector 210, the current conduction paths are increased, and the electron conduction distance of each layer of electrode sheet is reduced, thus achieving the purposes of reducing the internal resistance of the battery and equalizing the current density, and improving the heat dissipation effect in the battery operation process.

An embodiment of the present disclosure further provides a method for manufacturing a cell 300, mainly including the following steps.

S10: preparing a positive electrode sheet 100, wherein the positive electrode sheet 100 includes two first long sides 101 provided opposite to each other and two first short sides 103 provided opposite to each other, wherein one of the first long sides 101 is provided with a positive electrode current collector 110, one of the first short sides 103 is provided with a first tab 130; and the positive electrode current collector 110 is electrically connected to the first tab 130. Optionally, a positive electrode slurry is coated on a first base material 107 in accordance with grid-shaped coating, leaving a margin around four edges of the coating formed with the positive electrode slurry on the first base material 107, where the first base material 107 is optionally an aluminum foil; the positive electrode slurry on the first base material 107 is dried; and the first base material 107 is rolled and cut to obtain the positive electrode sheet 100, so that the margin at the first long side 101 of the positive electrode sheet 100 forms a positive electrode current collector 110, the margin at the first short side 103 forms a first tab 130 and a first margin base material 150, and the first tab 130 and the positive electrode current collector 110 are electrically connected to each other through the first margin base material 150. Leaving the margin on one long side and leaving the margin on one short side of the positive electrode sheet 100 can be completed at one time in the manufacturing process, then the process is simple and the manufacturing efficiency is high. It should be noted that, in the manufacturing process, the positive electrode slurry, that is, the first coating 105, is coated in the grid shape, and the coating of the positive electrode slurry leaves the margin on all four edges around the first base material 107, and in the subsequent cutting process, it is possible that only one long side of the cut first base material 107 is provided with a margin as the positive electrode current collector 110, and only one short side is provided with a margin as the first margin base material 150, so as to obtain the positive electrode sheet 100 in the present embodiment.

S20: preparing a negative electrode sheet 200, wherein the negative electrode sheet 200 includes two second long sides 201 provided opposite to each other and two second short sides 203 provided opposite to each other, wherein one of the second long sides 201 is provided with a negative electrode current collector 210, one of the second short sides 203 is provided with a second tab 230; and the negative electrode current collector 210 is electrically connected to the second tab 230. Optionally, a negative electrode slurry, i.e., a second coating 205, is coated on a second base material 207 in accordance with grid-shaped coating, leaving a margin around four edges of the coating formed with the negative electrode slurry on the second base material 207; the negative electrode slurry on the second base material 207 is dried; and the second base material 207 is rolled and cut to obtain the negative electrode sheet 200 in the present embodiment, so that the margin at the second long side 201 of the negative electrode sheet 200 forms a negative electrode current collector 210, the margin at the second short side 203 forms a second tab 230 and a second margin base material 250, and the second tab 230 and the negative electrode current collector 210 are electrically connected to each other through the second margin base material 250. The process is simple and the manufacturing efficiency is high.

S30: preparing a separator 310. A polyethylene porous film is selected as a base film, a ceramic coating and a PVDF sticky coating are coated on two side surfaces of the base film to manufacture the separator 310, which is split into corresponding width according to a design size for later use.

S40: alternately stacking the positive electrode sheets 100 and the negative electrode sheets 200, and interposing the separator 310 between the positive electrode sheets 100 and the negative electrode sheets 200 that are adjacent to each other. Optionally, a lamination process may use a Z-shaped laminating mode, a single-sheet laminating mode, a manner that the separator 310 and the positive electrode sheet 100 are thermally compounded in advance and then laminated with the negative electrode sheet 200, or a manner that the separator 310 and the negative electrode sheet 200 are thermally compounded in advance and then laminated with the positive electrode sheet 100.

S50: electrically connecting the plurality of positive electrode current collectors 110 to each other; and electrically connecting the plurality of negative electrode current collectors 210 to each other. Optionally, the electrical connection may be implemented by means of welding or metal spraying, which is not specifically limited herein.

S60: encasing the cell and encapsulating the same. The bare cell is put into a shell. After the positive and negative tabs are welded to poles of the shell, a top cover is laser-welded, and then sealing detection and moisture baking are carried out.

Figure 9:
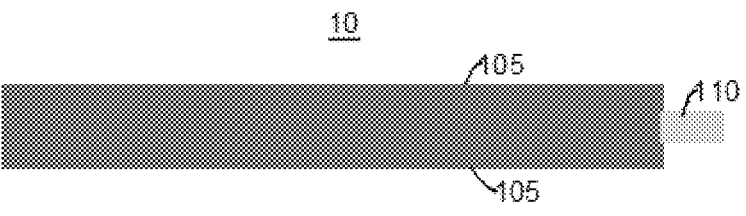
FIG. 9 is a sectional schematic view of a structure of a double-sided positive electrode sheet provided in an embodiment of the present disclosure.
Figure 10:
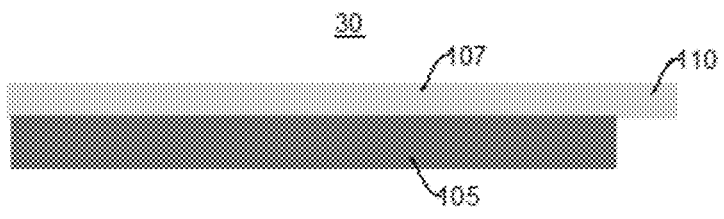
FIG. 10 is a sectional schematic view of a structure of a single-sided positive electrode sheet provided in an embodiment of the present disclosure.
Figure 11:
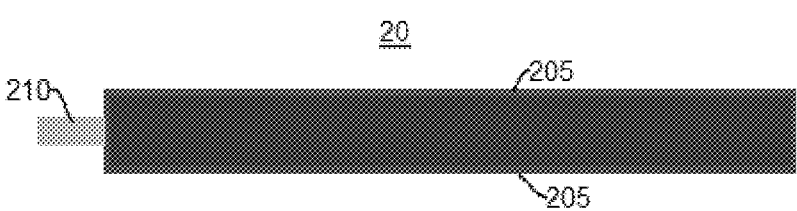
FIG. 11 is a sectional schematic view of a structure of a double-sided negative electrode sheet provided in an embodiment of the present disclosure.
Figure 12:
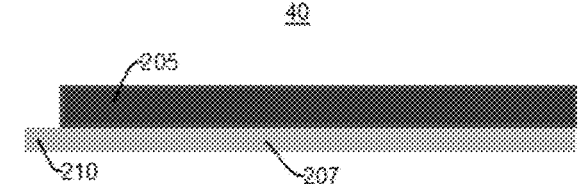
FIG. 12 is a sectional schematic view of a structure of a single-sided negative electrode sheet provided in an embodiment of the present disclosure.

It can be understood that, according to different actual use conditions or different selection of lamination processes, the positive electrode sheet 100 may be a double-sided positive electrode sheet 10, as shown in FIG. 9, and the first coating 105 is provided on two surfaces of the first base material 107; it is also possible that the positive electrode sheet 100 is a single-side positive electrode plate 30, as shown in FIG. 10, and the first coating 105 is provided only on one surface of the first base material 107. The negative electrode sheet 200 may be a double-sided negative electrode sheet 20, as shown in FIG. 11, and the second coating 205 is provided on two surfaces of the second base material 207; it is also possible that negative electrode sheet 200 is a single-side negative electrode plate 40, as shown in FIG. 12, and the second coating 205 is provided only on one surface of the second base material 207.

When the single-sheet laminating mode is used, as shown in FIG. 8, optionally, the double-sided positive electrode sheets 10 and the double-sided negative electrode sheets 20 are alternately stacked, optionally, the outermost layers (bottom layer and top layer) are respectively provided with a layer of separator 310, and the single-side negative electrode sheet 40 is provided above the bottom layer of separator 310, the single-sided positive electrode sheet 30 is provided below the top layer of separator 310, and the double-sided positive electrode sheets 10 and the double-sided negative electrode sheets 20 are alternately provided between the single-sided negative electrode sheet 40 and the single-sided positive electrode sheet 30, and a positive electrode sheet 100 and a negative electrode sheet 200 that are adjacent are separated by a layer of separator 310. Finally, the positive electrode current collectors 110 located on one long side are welded or metal-sprayed to realize the electrical conduction, and the negative electrode current collectors 210 located on the other long side are welded or metal-sprayed to realize the electrical conduction, thus obtaining a semi-finished bare cell.

Figure 13:
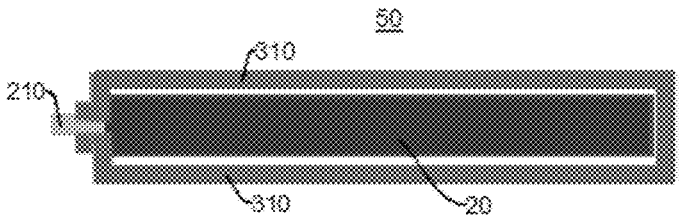
FIG. 13 is a sectional schematic view of a structure of a first thermal compound unit provided in an embodiment of the present disclosure.
Figure 14:
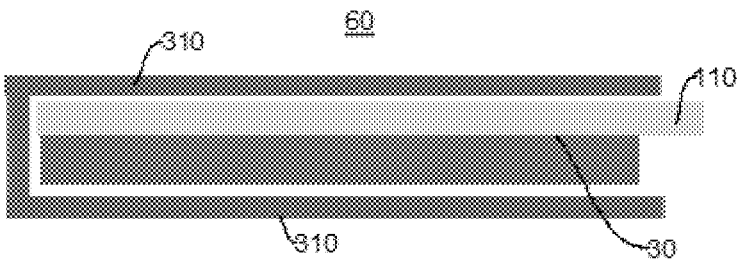
FIG. 14 is a sectional schematic view of a structure of a second thermal compound unit provided in an embodiment of the present disclosure.
Figure 15:
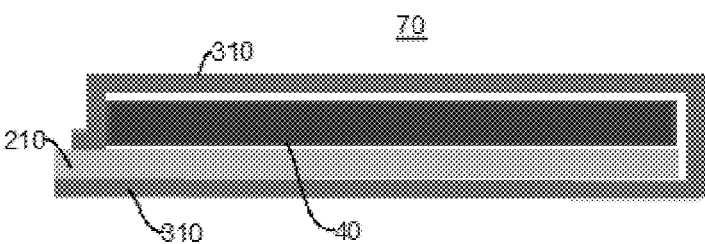
FIG. 15 is a sectional schematic view of a structure of a third thermal compound unit provided in an embodiment of the present disclosure.

Alternatively, the positive electrode sheet 100 or the negative electrode sheet 200 and the separator 310 also may be thermally compounded in advance to obtain a compound unit, and then lamination is performed. The positive electrode sheet 100 and the separator 310 are hot-pressed to obtain a first compound unit which is then laminated with the negative electrode sheet 200. Alternatively, the negative electrode sheet 200 and the separator 310 are hot-pressed to obtain a second compound unit which is then laminated with the positive electrode sheet 100. Optionally, FIG. 13 is a schematic view of a sectional structure of a first thermal compound unit 50 of two layers of separators 310 and the double-sided negative electrode sheet 20, FIG. 14 is a schematic view of a sectional structure of a second thermal compound unit 60 of two layers of separators 310 and the single-sided positive electrode sheet 30, and FIG. 15 is a schematic view of a sectional structural of a third thermal compound unit 70 of the two layers of separators 310 and the single-sided negative electrode sheet 40.

Figure 16:
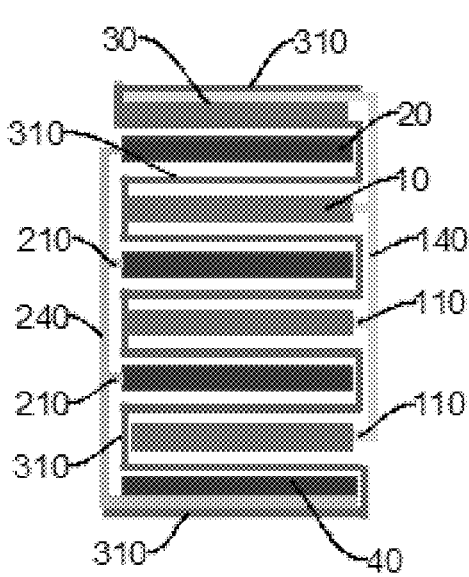
FIG. 16 is a structural schematic view of a cell provided in an embodiment of the present disclosure from a first angle of view.
Figure 17:
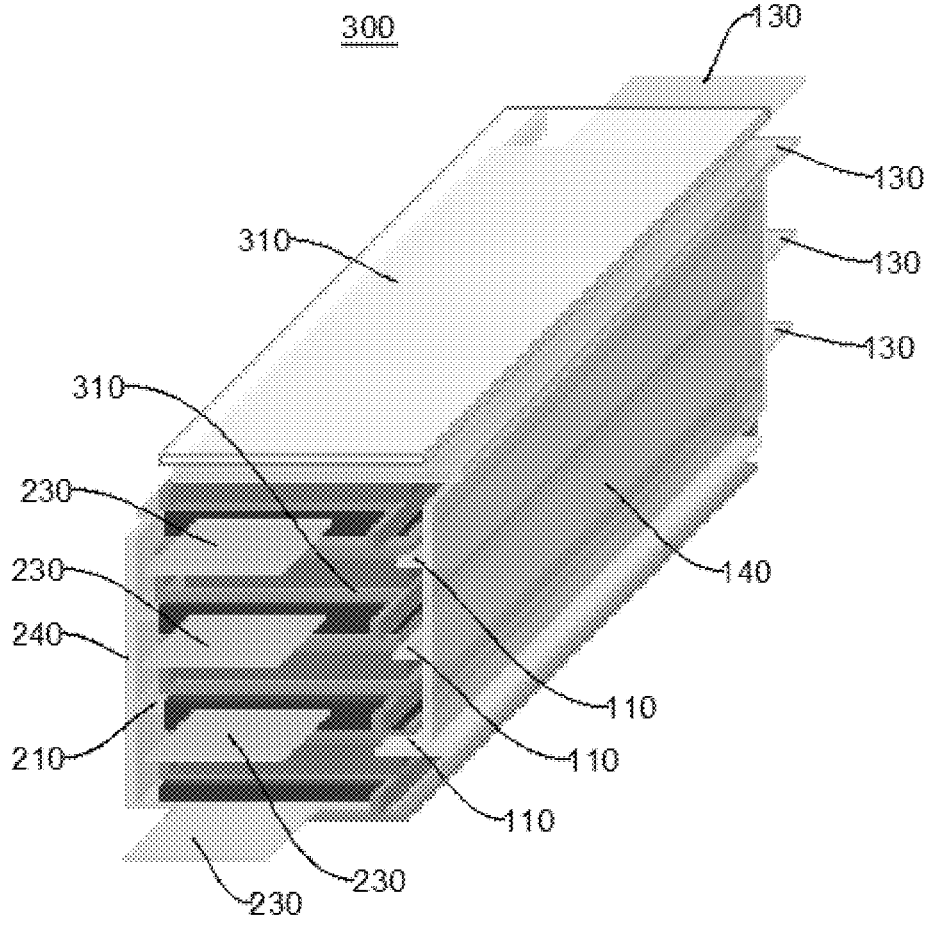
FIG. 17 is a structural schematic view of a cell provided in an embodiment of the present disclosure from a second angle of view.

FIG. 16 and FIG. 17 show schematic views of laminated cell 300 obtained in a Z-shaped laminating mode. After the lamination, the double-sided positive electrode sheets 10 and the double-sided negative electrode plates 20 are alternately stacked, and a positive electrode sheet 100 and a negative electrode sheet 200 that are adjacent are provided with the separator 310 therebetween at intervals. Finally, all of the positive electrode current collectors 110 on one long side are welded or metal-sprayed to realize the electrical conduction, and all of the negative electrode current collectors 210 on the other long side are welded or metal-sprayed to realize the electrical conduction.

Figure 18:
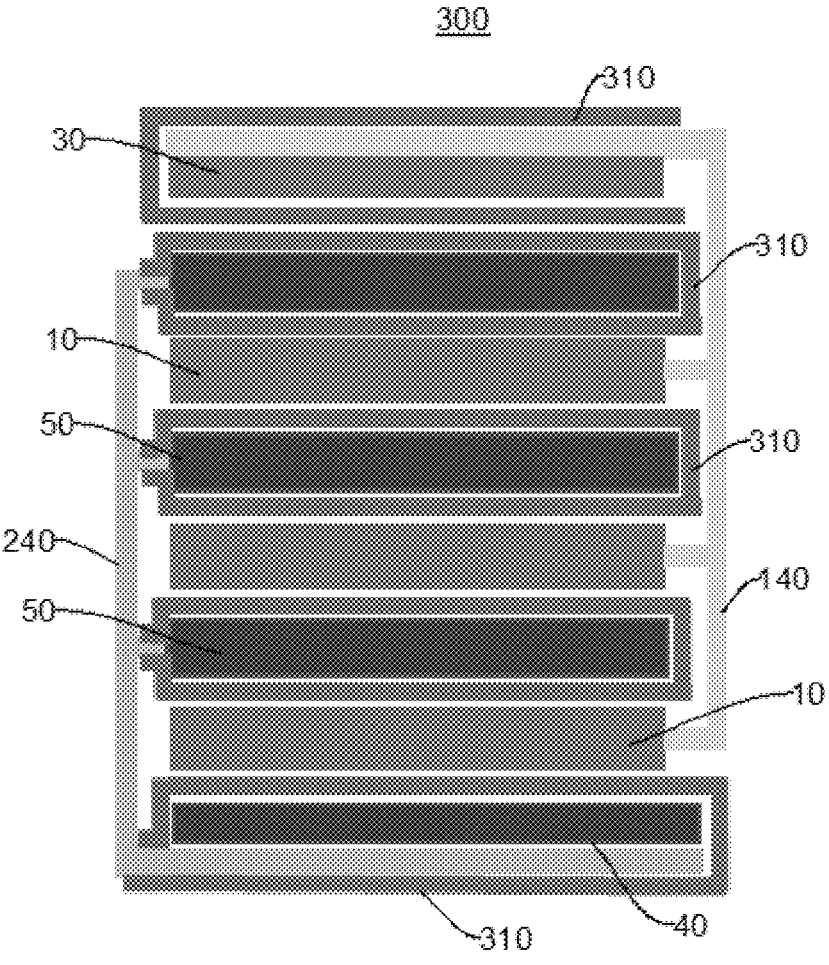
FIG. 18 is a sectional schematic view of a structure of another cell provided in an embodiment of the present disclosure.

As shown in FIG. 18, two layers of separators 310 and the double-sided negative electrode sheets 20 are used to obtain the first thermal compound units 50, which are then laminated with the double-sided positive electrode sheets 10 to obtain the laminated cell 300, wherein after the lamination, the double-sided positive electrode sheets 10 and the double-sided negative electrode sheets 20 are alternately stacked, and are separated by the two layers of separators 310 of the compound units, thus achieving the insulating effect.

Hereinafter, the description is made with reference to specific manufacturing embodiments.

Embodiment 1

(1) Preparing a Positive Electrode Sheet 100.

A positive electrode active material NMC (811), a conductive agent carbon black SP (TIMCAL), and a binder PVDF (Arkema) are mixed according to a mass ratio of 96:2:2, a solvent NMP is added, and the mixture is stirred with a stirrer to form a uniform and stable positive electrode slurry; the positive electrode slurry is uniformly coated onto an aluminum foil in accordance with grid-shaped coating, and during the coating, a margin is left around four edges of the coating, where no coating is provided; the positive electrode slurry is dried, and then rolled, split, and film-cut to obtain the positive electrode sheet 100 as shown in FIG. 2 and FIG. 3.

(2) Preparing a Negative Electrode Sheet 200.

A negative electrode active material graphite, a conductive agent acetylene black, a thickening agent CMC, and a binder SBR are mixed according to a mass ratio of 96.5: 0.5:1.5:1.5, then a solvent deionized water is added, and the mixture is stirred in a stirrer to obtain a uniform and stable negative electrode slurry; the negative electrode slurry is uniformly coated on a copper foil in accordance with grid-shaped coating, and during the coating, a margin is left around four edges of the coating, where no coating is provided; the negative electrode slurry is dried, and then rolled, split, and film-cut to obtain the negative electrode sheet 200 as shown in FIG. 4 and FIG. 5.

(3) Preparing a Separator 310.

A polyethylene porous film is selected as a base film, and a ceramic coating and a PVDF sticky coating are coated on two side surfaces thereof to manufacture the separator 310, which is cut into corresponding width according to Design Dimension for Later Use.

(4) Preparing an Electrolytic Solution.

Ethylene carbonate (EC), ethyl methyl carbonate (EMC), and diethyl carbonate (DEC) are mixed according to a volume ratio of 1:1:1 to obtain an organic solvent, and then sufficiently dried lithium salt $LiPF_6$ is dissolved in the mixed solvent to formulate the electrolyte solution with a concentration about 1 mol/L.

(5) Preparing a Bare Cell of a Lithium-Ion Battery.

The above positive electrode sheets 100, separators 310, and negative electrode sheets 200 are stacked in a Z-shaped laminating mode according to the structure shown in FIG. 6, so that the separators 310 are located between the positive electrode sheet 100 and negative electrode sheet 200 that are adjacent to achieve an isolating function. The single-sided positive electrode sheet 30 and the single-sided negative electrode sheet 40 wrapped by the separator 310 are used at the outermost layers. A semi-finished bare cell is formed by hot pressing.

(6) Welding Tabs for the Bare Cell.

The positive electrode current collectors 110 on the long sides of all layers of the semi-finished bare cell are welded at a position closest to a side edge of the electrode sheets, the margin aluminum foil on the side of first tab 130 is welded at a position closest to the edge of the electrode sheet, so that all layers of aluminum foils are welded together, and excess aluminum foils outside welding mark are cut off after the welding, and the bent blank aluminum foils are stuck to a side surface of the cell 300 with an insulating tape, to prevent the blank aluminum foils on the long side and the tab side from occupying spaces. Likewise, the negative electrode current collectors 210 on the other long sides of all layers and the margin copper foil on the side of second tab 230 are processed according to the same method as the above. Finally, the first tabs 130 (aluminum foil tabs) of all layers are pre-welded together and then welded with the positive tabs; the second tabs 230 (copper foil tabs) of all layers are pre-welded together and then welded with the negative tabs, thus obtaining the bare cell as shown in FIG. 16 and FIG. 17.

(7) Encasing the Bare Cell and Encapsulating the Same.

The bare cell is put into an aluminum-shell outer package. After the positive and negative tabs are welded to poles of the shell, a top cover is laser-welded; and then sealing detection and moisture baking are performed.

(8) Pouring a Solution into the Cell 300, Forming, and Testing.

After the cell 300 is poured with an electrolytic solution and infiltrated at a high temperature, formation, sealing, and testing of the cell 300 are performed, thus obtaining a finished lithium-ion battery.

Embodiment 2

The positive electrode sheets 100, the negative electrode sheets 200, the separators 310, and the electrolyte solution are prepared according to the method in Embodiment 1. Firstly, the double-sided negative electrode sheet 20 and two layers of separators 310 are thermally compounded to obtain the first thermal compound unit 50 as shown in FIG. 13; the single-sided positive electrode sheet 30 and two layers of separators 310 are thermally compounded, to obtain the second thermal compound unit 60 as shown in FIG. 14; the single-sided negative electrode sheet 40 and two layers of separators 310 are thermally compounded to obtain the third thermal compound unit 70 as shown in FIG. 15, and then lamination is performed according to the structure shown in FIG. 7, and the first tab 130 and the second tab 230 are made to be located on the same short side, thus obtaining a semi-finished bare cell.

Then the positive electrode current collectors 110 on the long sides of all layers of the semi-finished bare cell are coated with a conductive slurry and dried, so that all layers of aluminum foils are conductively connected together; the margin aluminum foil (electrical conduction body) on the side of first tab 130 is coated with the conductive slurry and dried, so that all layers of aluminum foils are electrically connected together; then, a conductive layer is covered and pasted to a side surface of the cell 300 with an insulating tape, preventing the conductive layer from direct contact with the shell to be short-circuited. Likewise, the negative electrode current collectors 210 on the other long side of all layers and the margin copper foil at the side of second tab 230 are processed in the same method as the above. Finally, the first tabs 130 (aluminum foil tabs) of all layers are pre-welded together, and then the positive tabs are welded. The second tabs 230 (copper foil tabs) of all layers are pre-welded together and then welded with the negative tabs, thus obtaining the bare cell as shown in FIG. 18.

The bare cell is placed into an aluminum plastic composite film outer package, and after the positive and negative tabs and side encapsulation and top encapsulation of the shell are completed, sealing detection and moisture baking are performed. Then, the cell 300 undergoes solution injection, formation, and testing, thus obtaining a finished lithium-ion battery.

Embodiment 3

The positive electrode sheets, the negative electrode sheets, the separators 310, and the electrolytic solution are prepared according to the method in Embodiment 1, and then single-sheet lamination is performed according to the structure shown in FIG. 6 to obtain a semi-finished bare cell.

Then positive electrode current collectors 110 (margin aluminum foils at edges) on the long sides of all layers of the semi-finished bare cell and the electrical conduction body (margin aluminum foils on the side of first tab 130) on the positive electrode sheet 100 are welded at a position closest to a side edge of the sheets, so that all layers of aluminum foils are welded together, and excess aluminum foils outside welding mark are cut off after the welding, and the bent blank aluminum foils are stuck to a side surface of the cell 300 with an insulating tape, to prevent the blank aluminum foils on the side and the tab side from occupying spaces. Likewise, the negative electrode current collectors 210 on the other long sides of all layers and the margin copper foil on the side of second tab 230 are processed according to the same method as the above. Finally, the first tabs 130 (aluminum foil tabs) of all layers are pre-welded together and then welded with the positive tabs. The second tabs 230 (copper foil tabs) of all layers are pre-welded together and then welded with the negative electrode tabs, thus obtaining the bare cell as shown in FIG. 8.

The bare cell is placed into an aluminum plastic composite film outer package, and after the positive and negative tabs and side encapsulation and top encapsulation of the shell are completed, sealing detection and moisture baking are completed. Then, the cell 300 undergoes solution injection, formation, and testing, thus obtaining a finished lithium-ion battery.

According to the method for manufacturing the cell 300 provided in the embodiments of the present disclosure, one long side and one short side of each positive electrode sheet 100 are respectively designed to leave the margin, i.e., the margin is left, the first tab 130 is provided on the short side of the base material designed to be blank, the margin on the long side serves as the positive electrode current collector 110 of the positive electrode sheet 100, and the margin on the short side serves as the electrical conduction body for the positive electrode current collector 110 and the first tab 130; one long side and one short side of each negative electrode sheet 200 are respectively designed to leave the margin, i.e., the margin is left, the second tab 230 is provided on the short side of the base material designed to be blank, the margin on the long side serves as the negative electrode current collector 210 of the negative electrode sheet 200, and the margin on the short side serves as the electrical conduction body for the negative electrode current collector 210 and the second tab 230. Finally, the positive electrode sheets 100 and the negative electrode sheets 200 are alternately stacked, and the margins on the long sides and the short sides of the positive electrode sheets 100 of all layers are electrically connected to each other by welding or metal-spraying, and the margins on the long sides and the short sides of the negative electrode sheets 200 of all layers are electrically connected to each other by welding or metal-spraying, thus obtaining the bare cell. The process is simple, has high production efficiency, is easy to assemble, can increase the current conduction paths and reduce the electron conduction distance of each layer of sheet, thereby achieving the purposes of reducing the internal resistance of the cell 300 and equalizing the current density, and improving the heat dissipation effect in the battery operation process.

The present embodiment further provides a battery, including a shell and the above cell 300, wherein the cell 300 is manufactured by the above manufacturing method. The shell has a dimension adapted to the dimension of the folded cell 300, and the cell 300 is arranged inside the shell. Optionally, the shell is an aluminum shell, insulating members are provided between all the connected positive electrode current collectors 110 and the shell, and insulating members are provided between all the connected negative electrode current collectors 210 and the shell, so as to prevent the positive electrode current collectors 110 or the negative electrode current collectors 210 from contact with the shell to be short-circuited.

In conclusion, the embodiments of the present disclosure provide the cell 300, the method for manufacturing the cell 300, and the battery, and have the beneficial effects in the following aspects.

According to the method for manufacturing the cell 300, the margin is left on one long side and one short side of each positive electrode sheet 100, the margin on the long side serves as the positive electrode current collector 110 of the positive electrode sheet 100, and the margin on the short side is configured to connect the first tab 130 at the short side and the positive electrode current collector 110. The margin is left on one long side and one short side of each negative electrode sheet 200, the margin on the long side serves as the negative electrode current collector 210 of the negative electrode sheet 200, and the margin on the short side is configured to connect the second tab 230 at the short side and the negative electrode current collector 210. This manufacturing process is simple, the production efficiency is high, the cell 300 manufactured by the manufacturing method can reduce the internal resistance, equalize the current density and temperature, and has good heat dissipation effect.

This battery, including the above cell 300, has a simple structure, is easy to assemble, and is especially suitable for the field of configuring a battery with a larger length-to-width ratio. By increasing the current conduction paths, reducing the electron conduction distance of each layer of sheet, the internal resistance of the power battery with a larger length-to-width ratio is reduced, the current density and the temperature are equalized, and the heat dissipation effect is improved as much as possible, while ensuring other battery performances such as energy density as much as possible. Moreover, this battery avoids waste of an internal space of the cell 300 as much as possible, does not need to change the design of a module or a pack, which can ensure to reduce the cost and improve the benefit while satisfying the output requirements.

The above-mentioned are merely for specific embodiments of the present disclosure, but the scope of protection of the present disclosure is not limited thereto, and changes or substitutions that may be easily conceived by any skilled person familiar with the technical field within the technical scope disclosed in the present disclosure should fall within the scope of protection of the present disclosure. Therefore, the scope of protection of the present disclosure should be determined by the scope of protection of the claims.

INDUSTRIAL APPLICABILITY

The cell 300 of the present disclosure can increase the current conduction channels, make the current distribution more uniform, reduce the resistance, and facilitate improving the heat dissipation effect.

The method for manufacturing the cell 300 in the present disclosure has a simple process and high production efficiency, can increase the current conduction paths and reduce the electron conduction distance of each layer of sheet, thereby achieving the purposes of reducing the internal resistance of the cell and equalizing the current density and temperature, and improving the heat dissipation effect in the battery operation process.

The battery in the present disclosure has a simple structure, is easy to assemble, and is especially applicable to the field of batteries with a larger length-to-width ratio. By increasing the current conduction paths, reducing the electron conduction distance of each layer of sheet, the internal resistance of the power battery with a larger length-to-width ratio is reduced, the current density and the temperature are equalized, and the heat dissipation effect is improved as much as possible, while ensuring other battery performances such as energy density as much as possible. Moreover, this battery avoids waste of an internal space of the cell 300 as much as possible, does not need to change the design of a module or a pack, which can ensure to reduce the cost and improve the benefit while satisfying the output requirements.

What is claimed is:

1. A method for manufacturing a cell, comprising:

coating a positive electrode slurry on an aluminum foil in accordance with grid-shaped coating; leaving a margin around four edges of a coating formed with the positive electrode slurry on the coated aluminum foil;

drying, rolling, and cutting the coated aluminum foil to obtain a plurality of positive electrode sheets to form a first long side margin and a first short side margin, wherein each positive electrode sheet of the plurality of positive electrode sheets comprises two first long sides, wherein the first long side margin is arranged at only one of the two first long sides and two first short sides, wherein the first short side margin is arranged at only one of the two first short sides, the first long side margin serves as a positive electrode current collector, a middle of one first short side of the two first short sides is provided with a first tab, and the first short side margin is located between the first tab and the positive electrode current collector and is configured to implement electrical connection between the positive electrode current collector and the first tab;

coating a negative electrode slurry on a copper foil in accordance with grid-shaped coating; leaving a margin around four edges of a coating formed with the negative electrode slurry on the coated copper foil;

drying, rolling, and cutting the coated copper foil to obtain a plurality of negative electrode sheets to form a second long side margin and a second short side margin, wherein each negative electrode sheet of the plurality of negative electrode sheets comprises two second long sides, wherein the second long side margin is arranged at only one of the two second long sides and two second short sides, and wherein the second short side margin is arranged at only one of the two second short sides, the second long side margin serves as a negative electrode current collector, a middle of one second short side of the two second short sides is provided with a second tab, and the second short side margin is located between the second tab and the negative electrode current collector and is configured to implement electrical connection between the negative electrode current collector and the second tab;

preparing a separator;

alternately stacking the plurality of positive electrode sheets and the plurality of negative electrode sheets, and interposing the separator between the positive electrode sheets and the negative electrode sheets that are adjacent to each other;

stacking the positive electrode current collector of each positive electrode sheet of the plurality of positive electrode sheets at a same side, and stacking the negative electrode current collector of each negative electrode sheet of the plurality of negative electrode sheets at a side opposite to the same side where the positive electrode current collector of each positive electrode sheet of the plurality of positive electrode sheets is stacked; and providing the first short side and the second short side opposite to each other.

2. The method according to claim 1, after the step of alternately stacking the plurality of positive electrode sheets and the plurality of negative electrode sheets, further comprising:

electrically connecting the positive electrode current collector of each positive electrode sheet of the plurality of positive electrode sheets to each other; and electrically connecting the negative electrode current collector of each negative electrode sheet of the plurality of negative electrode sheets to each other.

3. The method according to claim 2, wherein the step of electrically connecting the positive electrode current collector of each positive electrode sheet of the plurality of positive electrode sheets to each other comprises: providing a first connecting substrate; and electrically connecting the positive electrode current collector of each positive electrode sheet of the plurality of positive electrode sheets to the first connecting substrate; and the step of electrically connecting the negative electrode current collector of each negative electrode sheet of the plurality of negative electrode sheets to each other comprises: providing a second connecting substrate; and electrically connecting the negative electrode current collector of each negative electrode sheet of the plurality of negative electrode sheets to the second connecting substrate.

4. The method according to claim 1, wherein the step of alternately stacking the plurality of positive electrode sheets and the plurality of negative electrode sheets comprises:

laminating a positive electrode sheet, the separator, and a negative electrode sheet in a single-sheet laminating mode to obtain a semi-finished bare cell; or hot-pressing the positive electrode sheets and the separator to obtain a first compound unit, and laminating the first compound unit with the negative electrode sheets to obtain a semi-finished bare cell; or hot-pressing the negative electrode sheets and the separator to obtain a second compound unit, and laminating the second compound unit with the positive electrode sheets to obtain a semi-finished bare cell.

5. A battery, comprising a shell and the cell manufactured by the method for manufacturing a cell according to claim 1, wherein the cell is provided in the shell.

* * * * *